United States Patent [19]

Wang et al.

[11] Patent Number: 5,038,291

[45] Date of Patent: Aug. 6, 1991

[54] COMPUTERIZED PLY PATTERN GENERATION

[75] Inventors: Weiping Wang, Schenectady; James M. Beck, Elizaville, both of N.Y.

[73] Assignee: General Electric Company, Schenectady, N.Y.

[21] Appl. No.: 332,084

[22] Filed: Apr. 3, 1989

[51] Int. Cl.$^5$ .............................................. G06F 15/62
[52] U.S. Cl. .................................... 364/476; 364/522
[58] Field of Search ............... 364/512, 513, 476, 522, 364/518, 521, 476, 577, 578; 340/729

[56] References Cited

U.S. PATENT DOCUMENTS

| | | | |
|---|---|---|---|
| 4,618,924 | 10/1986 | Hinds | 364/191 |
| 4,733,021 | 3/1988 | Harris et al. | 364/476 |
| 4,736,306 | 4/1988 | Christensen et al. | 364/513 |
| 4,791,581 | 12/1988 | Ohba | 364/521 |
| 4,791,583 | 12/1988 | Colburn | 364/522 |

OTHER PUBLICATIONS

Handbook of Mathematics, Bronshtein and Semendyayev, 1985, Van Nostrand Reinhold Co., pp. 566-571, 710-711.

*Primary Examiner*—Jerry Smith
*Assistant Examiner*—Paul Gordon
*Attorney, Agent, or Firm*—Marilyn Glaubensklee; James C. Davis, Jr.; Paul R. Webb, II

[57] ABSTRACT

A computerized process to generate ply patterns for manufacturing industrial parts by stacking and molding a large number of plies is based on solid modeling. The outermost shell of the part is unfolded to a planar pattern using a surface development procedure. The part is decomposed based on the ply thickness; the shell with the ply thickness is removed from the solid model once the surface is unfolded. A set of ply patterns are formed by repeating the unfolding process until no more volume remains. More accurate patterns are produced in less time, especially plies for complexly shaped composite parts such as aircraft engine components.

14 Claims, 11 Drawing Sheets

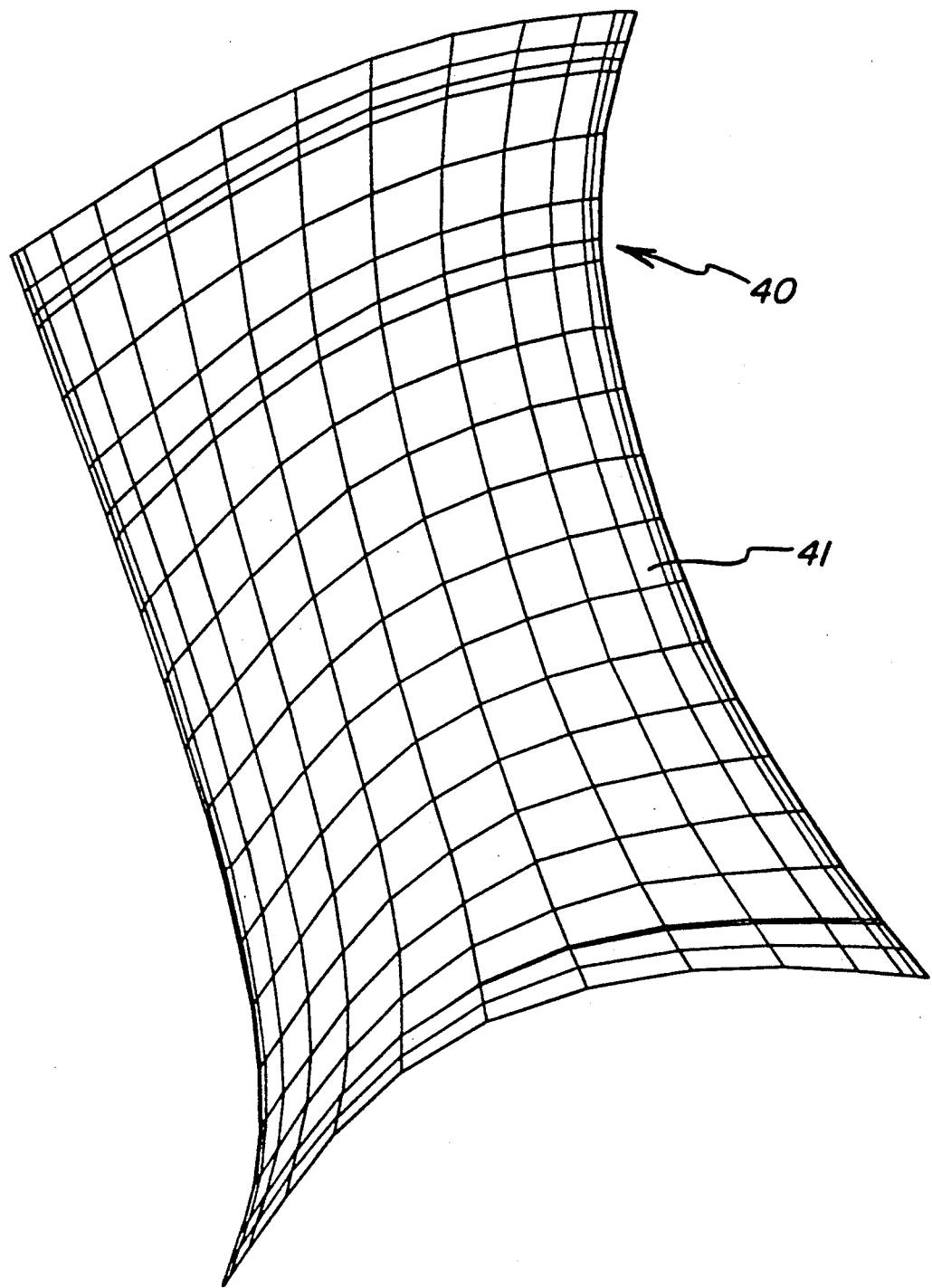
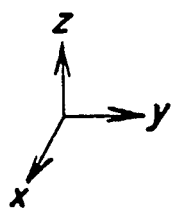
FIG. 6

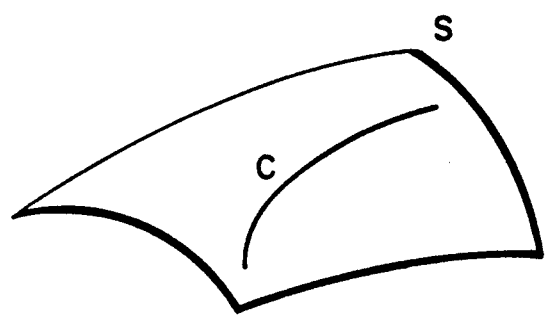
FIG. 8a
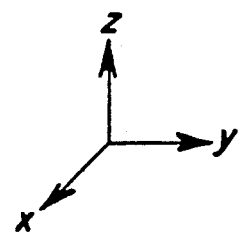
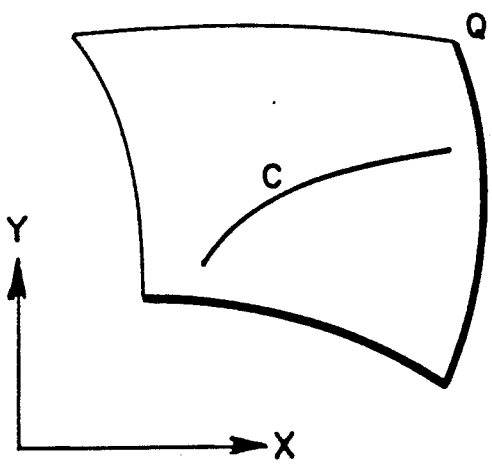
FIG. 8b

COMPUTERIZED PLY PATTERN GENERATION

Background of the Invention

This invention relates to a method of producing ply patterns for manufacturing industrial parts, and more particularly to a computerized process based on solid modeling.

Aircraft engines parts made of carbon-fiber composite material are appearing in new, light weight, high performance designs. One process for making these parts requires pressure molding. A kit of plies that are impregnated with resin is cured first in an amidization mold and then in a pressurized mold. One heated press which cures the resin-containing workpiece by heating according to a given temperature schedule and changing from low to high pressure after the start of resin cross linking is described in commonly assigned U.S. Pat. No. 4,773,021, L.P. Harris and R.K. Upadhyay, "Adaptive Model-Based Pressure Control and Method of Resin Cure". A stack of prepreg plies, cut from flat sheets of pre-impregnated material, must exactly fill the mold if part weakness due to resin-rich or resin-poor regions are to be avoided. Calculating the shapes of the individual ply patterns, for a complex part such as a guide vane or airfoil, is currently a labor intensive, time consuming process requiring many iterative attempts.

The prior method of calculating the shape of uniform thickness plies for making a precision solid part without any interior passages was to manually draw iso-thickness contours on a physical model. Contours are obtained by folding a sheet of Mylar ® plastic or paper to the surface of the model. A C-shaped micrometer with drawing pencils at the two ends of the opening is used as a tracing tool. The opening is set at a desired thickness and the part is manipulated to fit between the opening to trace out a contour. The sheet is removed from the model and unfolded, and the contours traced at various levels of thicknesses become ply patterns.

The result of this manual method is subject to a number of errors. For example, the gauged opening in theory is not the true thickness of a curved object, and the result further varies according to the skill of driving the tool. The flexible plastic or paper sheet does not deform and fold in the mold the same as the prepreg ply, thus ply patterns calculated with the plastic or paper sheet are inaccurate. This method is further complicated because iterative steps do not always improve the result. The adjustment of stacked plies is basically guesswork as the operator cannot accurately locate where and by how much the adjustments should be made. Consequently, many trial and error runs may be needed to obtain a set of ply patterns for production. It is essential to have an accurate ply shape and to put it in the right place as the plies are stacked manually.

Solid modeling is a good approach for the computerized representation of geometry. One scheme used in solid modeling is constructive solid geometry, in which a set of primitives, such as blocks, cylinders, spheres, cones and other solids bounded by quadric surfaces, and a set of constructive operators, e.g. union, difference and intersection, are used to create an object of complicated shape. There are many solid modeling systems, but a preferred solid modeler is General Electric's TRUCE because it is highly accurate and can be used for manufacturing purposes. For more information, refer to U.S. Pat. No. 4,618,924 —J. K. Hinds.

SUMMARY OF THE INVENTION

An object of the invention is to replace the manual calculation of ply patterns with a computerized, automated process that takes much less time.

Another object is to produce more accurate ply patterns that yield better quality composite parts, and other parts manufactured by stacking and joining plies.

Yet another object is to considerably simplify and reduce the lead time of manufacturing complexly shaped industrial parts such as those with doubly curved surfaces.

The improved computerized ply pattern generation process utilizes solid modeling and computational geometry techniques. One aspect of the invention is a process comprising the steps of providing a 3-dimensional solid model of the part and a mid-surface thereof; decomposing the part model into nested shells each having a thickness approximately equal to that of the plies; unfolding the shells in sequence to respective planar patterns using a surface development procedure; and determining contours of the planar patterns which are the boundaries of the respective plies. Then the plies may be cut out from a flat flexible sheet of a given material and stacked. The decomposing step may comprise deriving two sets of the nested shells, one on either side of the mid-surface, and the steps of unfolding to planar patterns and determining contours are performed for both sets.

The computerized ply pattern generation process is alternatively described as: generating a 3-dimensional solid model of the part and first and second curved outer surfaces and a curved mid-surface thereof; decomposing the part model into nested shells by calculating distances from the outer surfaces to the mid-surface at a network of points and producing contours of the shells by interpolating along these distances; developing the shells in sequence to planar patterns by dividing every shell surface into 3-dimensional patches which are mapped to 2-dimensional unfolded surfaces and aligned; and determining contours of the planar patterns and the shape of the plies.

A feature of the method is that the outer surfaces may be doubly curved and the developing comprises integrating along patch borders and adjusting initial conditions to ensure that end points of different integration paths converge. Other procedures used as needed are trimming surfaces outside the boundaries of the ply, and deforming patch borders and merging to form a continuous ply.

The illustrative embodiments automatically generate patterns for manufacturing composite parts with pre-impregnated plies which are stacked and then pressed and cured in a mold. Aircraft engine parts including airfoils, vanes and blades may be made with this Process. More accurate ply patterns are generated in a relatively short time and yield better quality parts.

BRIEF DESCRIPTION OF THE DRAWINGS

FIG. 6 shows a 3-dimensional surface model of the airfoil in FIG. 1, which consists of patches.

FIGS. 8a and 8b illustrate a surface development procedure to convert a 3-dimensional surface S into a planar surface Q.

DETAILED DESCRIPTION OF THE INVENTION

Figure 1:
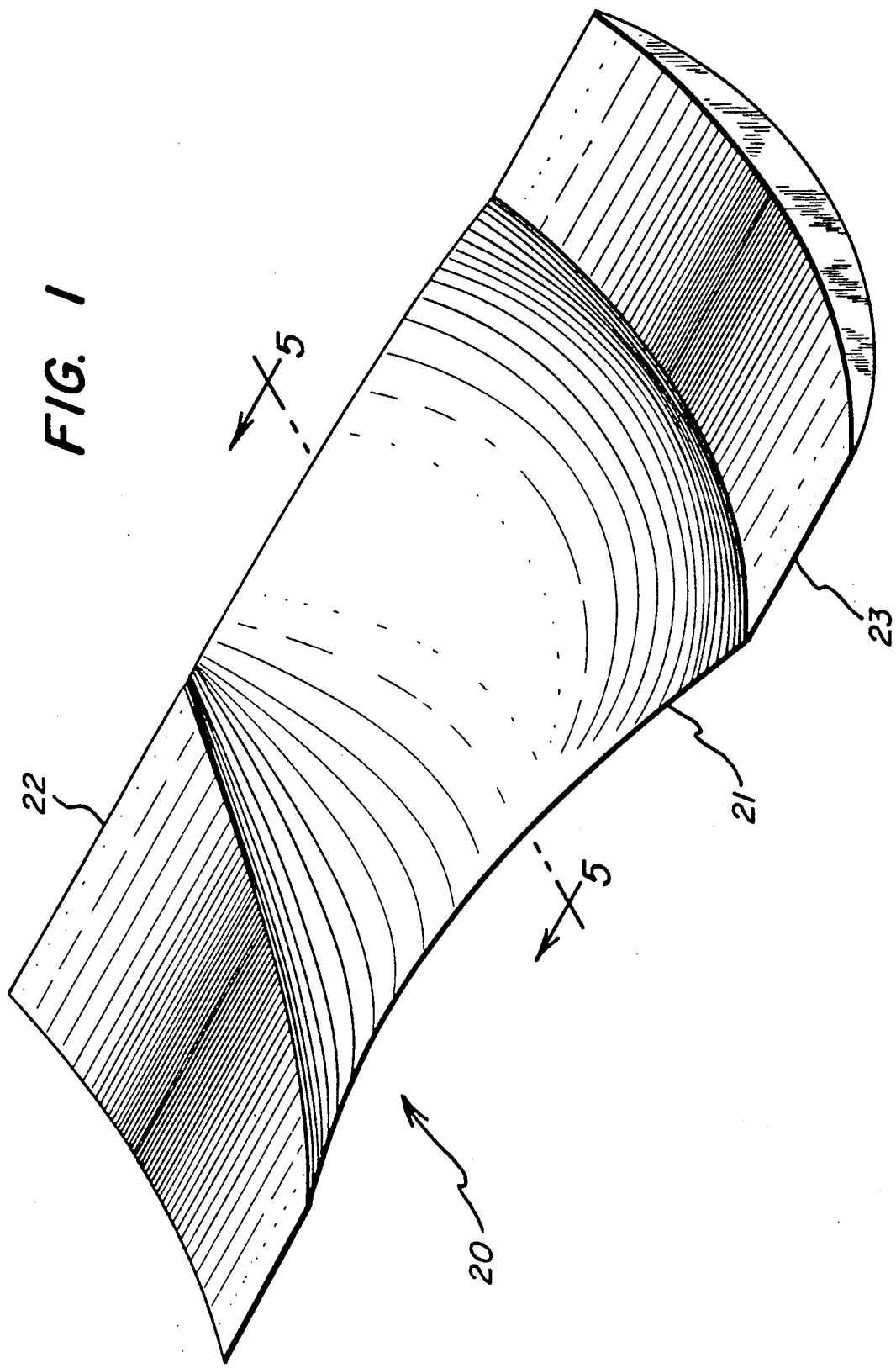
FIG. 1 is an isometric view cf an airplane engine composite part made by stacking and pressure molding a large number of pre-impregnated plies.
Figure 2:
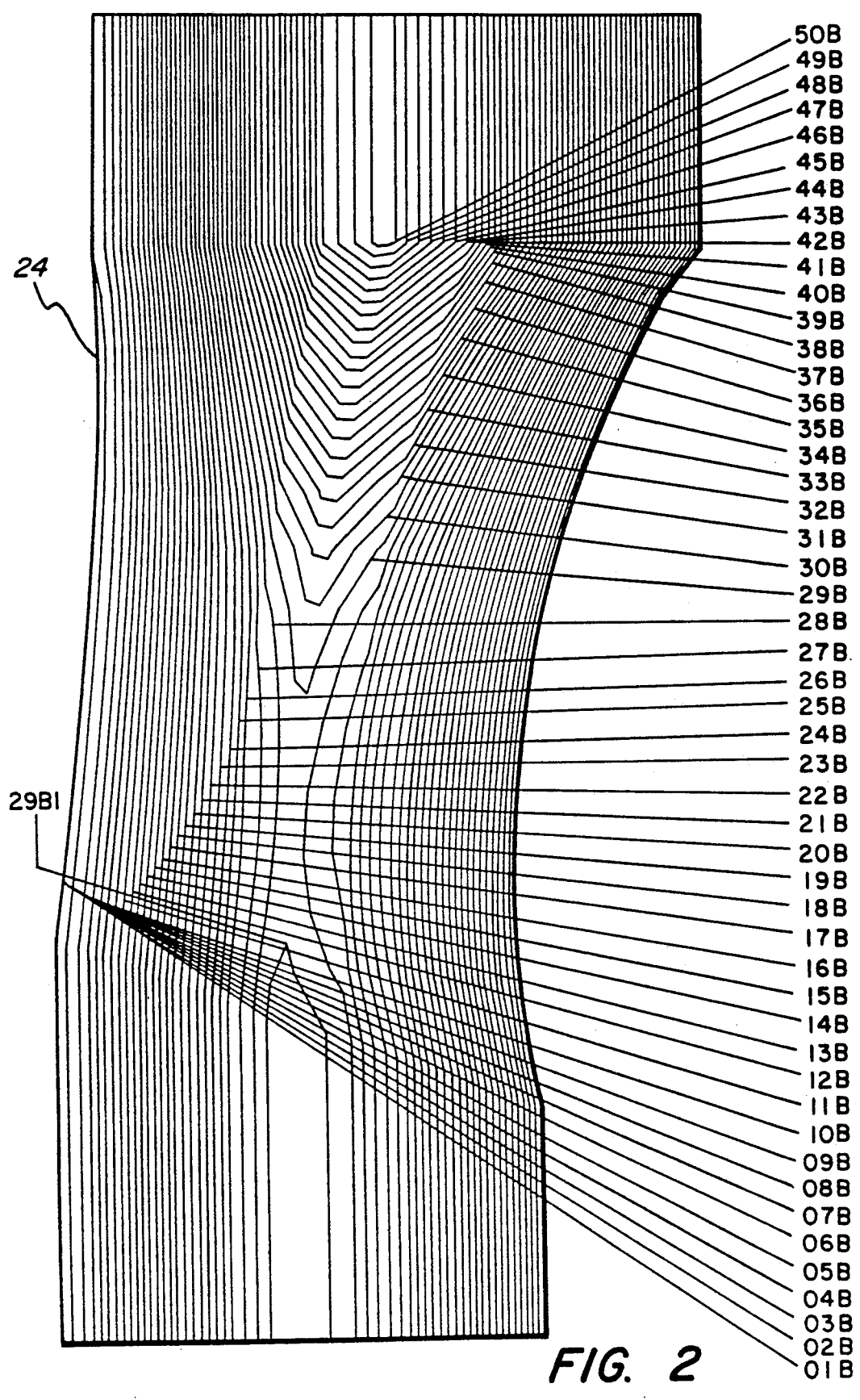
FIG. 2 is a plan view of ply patterns generated by the automated process, shown in their stacking positions.

The composite part 20 shown in FIG. 1 is typical of the complex shapes of aircraft engine components and demonstrates the advantages of generating ply patterns by a computerized method. This is a stator vane component, about 14 inches in length, and has a central blade or airfoil section 21 and curved ends 22 and 23 that are mounted on inner and outer shrouds. The airfoil section has doubly curved surfaces and both end sections are singly curved. The ply patterns 24 generated by the automated process are shown in FIG. 2 in their stacking positions. The patterns are cut out from a flat sheet of pre-impregnated material having a thickness of about 10 mils, and stacked one on top of the other in the order shown by the numbers on the right. The first two characters indicate the stacking sequence, and the third character designates the side of the mold to be placed. The fourth character is used for separate pieces in one ply. Another A set of 50 plies, having ply patterns that are different from those of the B set, are provided for the other half of the mold. The mold cavity has the same shape as the part being manufactured. After being pressed and cured in an autoclave or heated press such as that in U.S. Pat. No. 4,773,021, the disclosure of which is incorporated herein by reference, the result is the part in FIG. 1.

Figure 3:
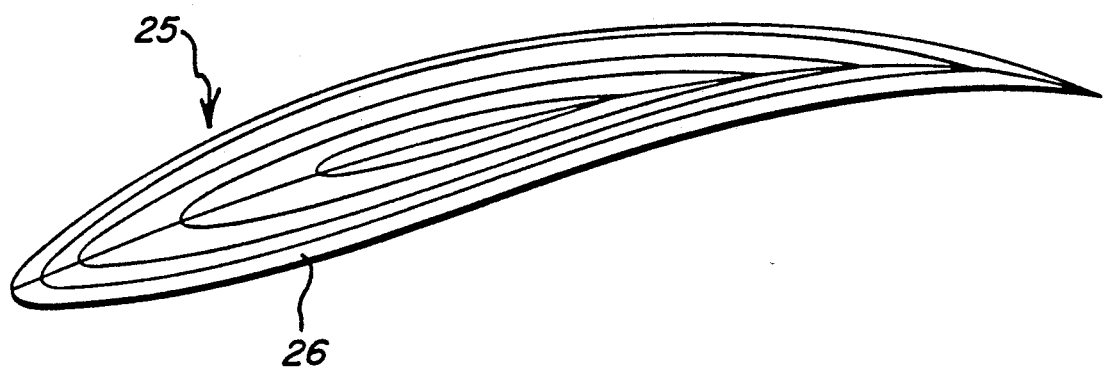
FIG. 3 is a schematic cross section through a jet engine blade showing the layers of prepreg plies as loaded into a mold cavity.

FIG. 3 is a cross section of an aircraft engine blade 25 showing the two sets of pre-impregnated plies 26 before pressing and curing in a mold. To assure the highest strength component, largest area plies are on the outside and the size of the plies decreases toward the center.

Solid modeling is used in this process to decompose a 3-dimensional part into nested shells, the thickness of each shell being equal to the net thickness of the pre-impregnated sheet material. Each shell is developed or laid flat into a planar surface. In general, a surface to be laid flat is non-developable and will have non-zero Gaussian curvature and cannot be laid flat without distortion. Pattern calculation thus require modeling the deformation of the process. Developable surfaces such as a cylinder by contrast can be unfolded and laid flat without distortion.

Figure 4:
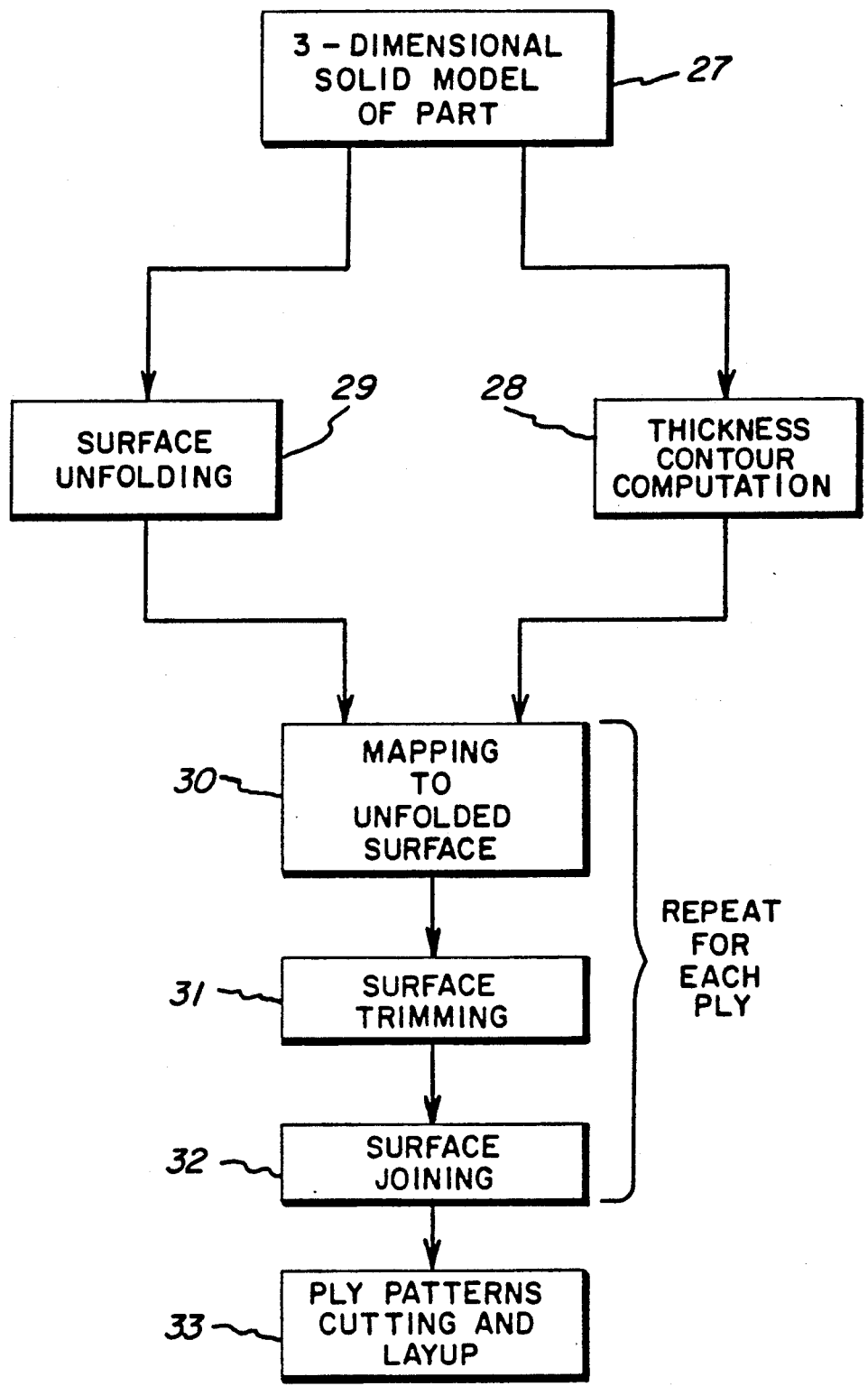
FIG. 4 is a flowchart of the ply pattern automation.

The flow chart in FIG. 4 gives the steps in an automated ply pattern generation process. The first step 27 is to provide, in a computer, a 3-dimensional solid geometric model of the part. The techniques of constructing a solid model, using the TRUCE (Tri-dimensional Rational Unified Cubic Engine) and other solid modelers, are well established and described in the literature. A description of the mid-surface and outer surfaces of the part are also provided. Steps 28–30 are computing iso-thickness contours on the curved surface, and unfolding or developing the surface and mapping contours to the unfolded surface. Steps 31 and 32 may not be essential to every ply pattern generation process but are often required for a complexly shaped part. These are to trim the contours that are outside a face or a portion of a surface of the part, and match and join the developed surfaces across adjacent faces on the part. Steps 30–32 are repeated for each ply. The final step 33 is cutting out the ply patterns from pre-impregnated sheets and the layup or stacking of the flat plies. The result is a kit of plies to be loaded into the mold cavity.

Figure 5:
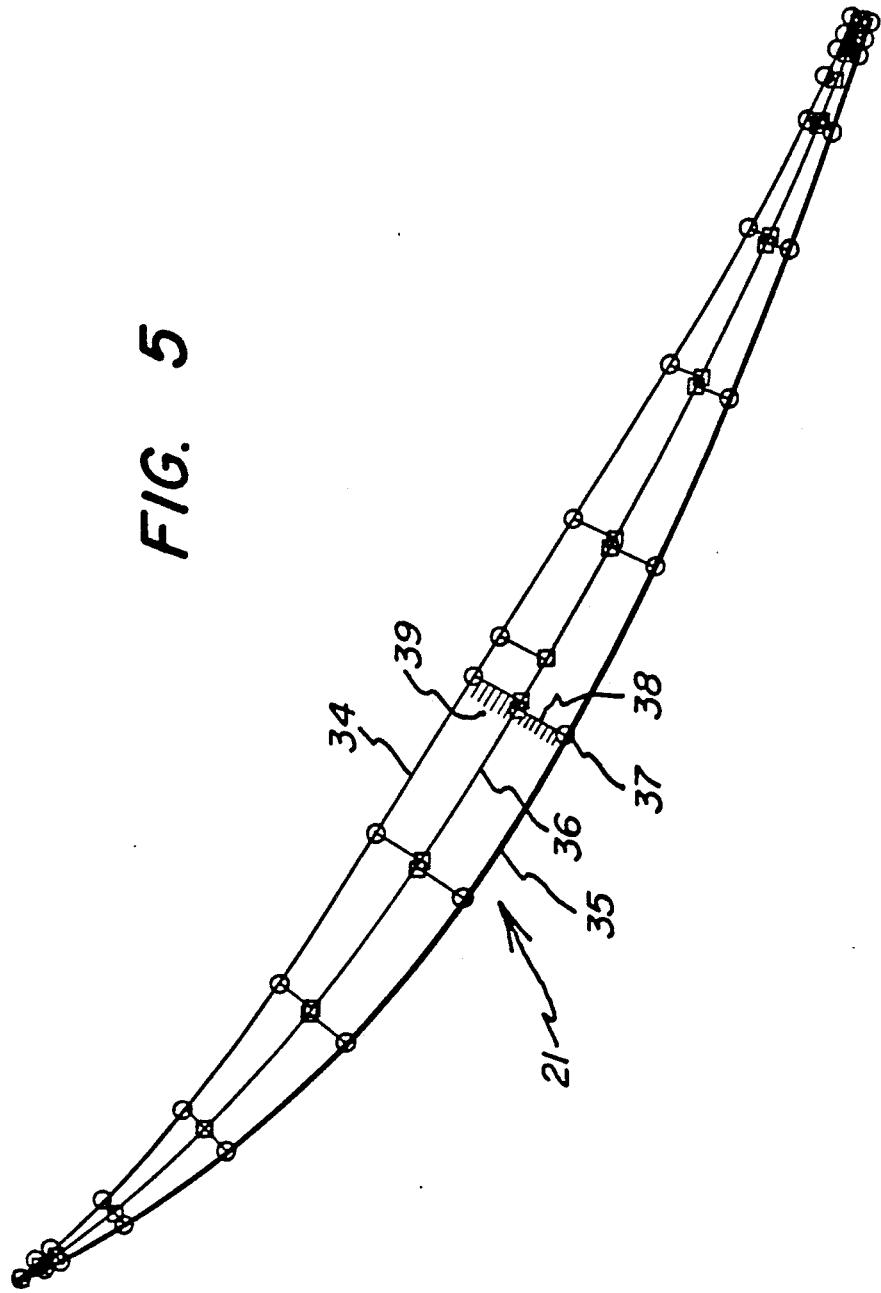
FIG. 5 is a cross section through the part taken on line 5—5 in FIG. 1 and illustrates computation of the thickness contour by sampling the distances from points on the outer surface to the mid-surface.

Decomposing the part model into nested shells is explained with reference to FIG. 5, which shows a cross section of the airfoil 21 and its outer curved surfaces 34 and 35 and curved mid-surface 36. To determine the boundary of the plies in 3-dimensional space, iso-thickness contours on the airfoil are computed. This is done by calculating the distance from an outer surface to the mid-surface. A network of points 37 are sampled from the outer surface and shortest distances 38 are calculated from each point to the mid-surface 36. The contours or shell boundaries are produced by interpolating along the sampled distances 38; this is illustrated schematically by the short dashed lines 39. The same procedure decomposes both singly curved end sections 22 and 23 of the part into a large number of nested shells.

Figure 7:
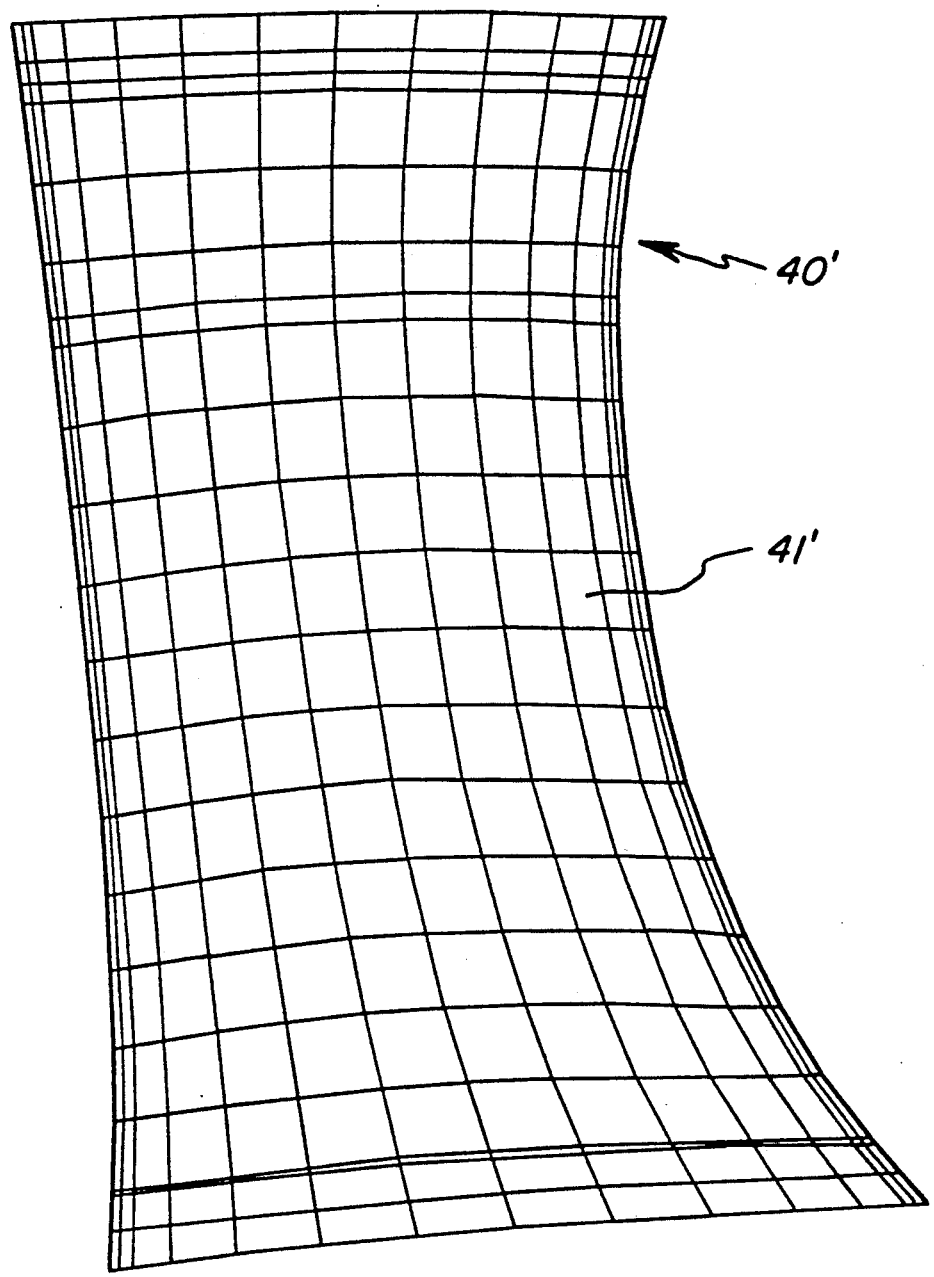
FIG. 7 shows the surface in FIG. 6 after surface development, as an unfolded, 2-dimensional surface.

Unfolding or developing the shells in sequence to planar patterns using a surface development procedure is explained referring to FIGS. 6 and 7. This comprises dividing every shell surface into 3-dimensional patches which are mapped to 2-dimensional unfolded surfaces and aligned. FIG. 6 shows a 3-dimensional surface model of a shell 40 in the airfoil section which consists of patches 41. The cubic spline patches have different sizes and are typically rectangular. FIG. 7 shows an unfolded 2-dimensional shell surface 40' and the unfolded or developed patches 41'. The division of shells in the end sections 22 and 23 (FIG. 1) into patches is not illustrated, but these patches are narrow and long, running the full length of the end section.

FIGS. 8a and 8b illustrate that if there is a curve on a 3-dimensional patch, mathematically one can get a corresponding 2-dimensional curve on a 2-dimensional surface.

The method for surface development is more particularly as follows. Given a patch S:

$$x = x(u, v) \qquad (1)$$

$$y = y(u, v) \qquad (2)$$

$$z = z(u, v) \qquad (3)$$

where $0 \leq u$, $v \leq 1$, as a subset of the surface, let the planar development Q be $$X = X(u, v) \qquad (4)$$

$$Y = Y(u, v) \tag{5}$$

Considering a curve C:

$$u = u(t) \tag{6}$$

$$v = v(t), \tag{7}$$

the mappings of C on S and Q should have the identical geodesic curvature $K_g$. Thus, the curve on the planar development Q can be determined by the differential equations:

$$Y'' - K_g X' = 0 \tag{8}$$

$$X'' + K_g Y' = 0 \tag{9}$$

The system of equations is solved numerically by using a Runge-Kutta integration method, with initial conditions: $X(0)$, $Y0$, $X'(0)$, and $Y'(0)$.

The geodesic curvature $K_g$ can be calculated with the following formula:

$$K_g = N \cdot (C' x C'')/(s')^3 \tag{10}$$

where N is the surface normal, C' and C'' are the first and second derivatives of the curve, respectively, and s' is the algebraic value of C'.

Figure 9:
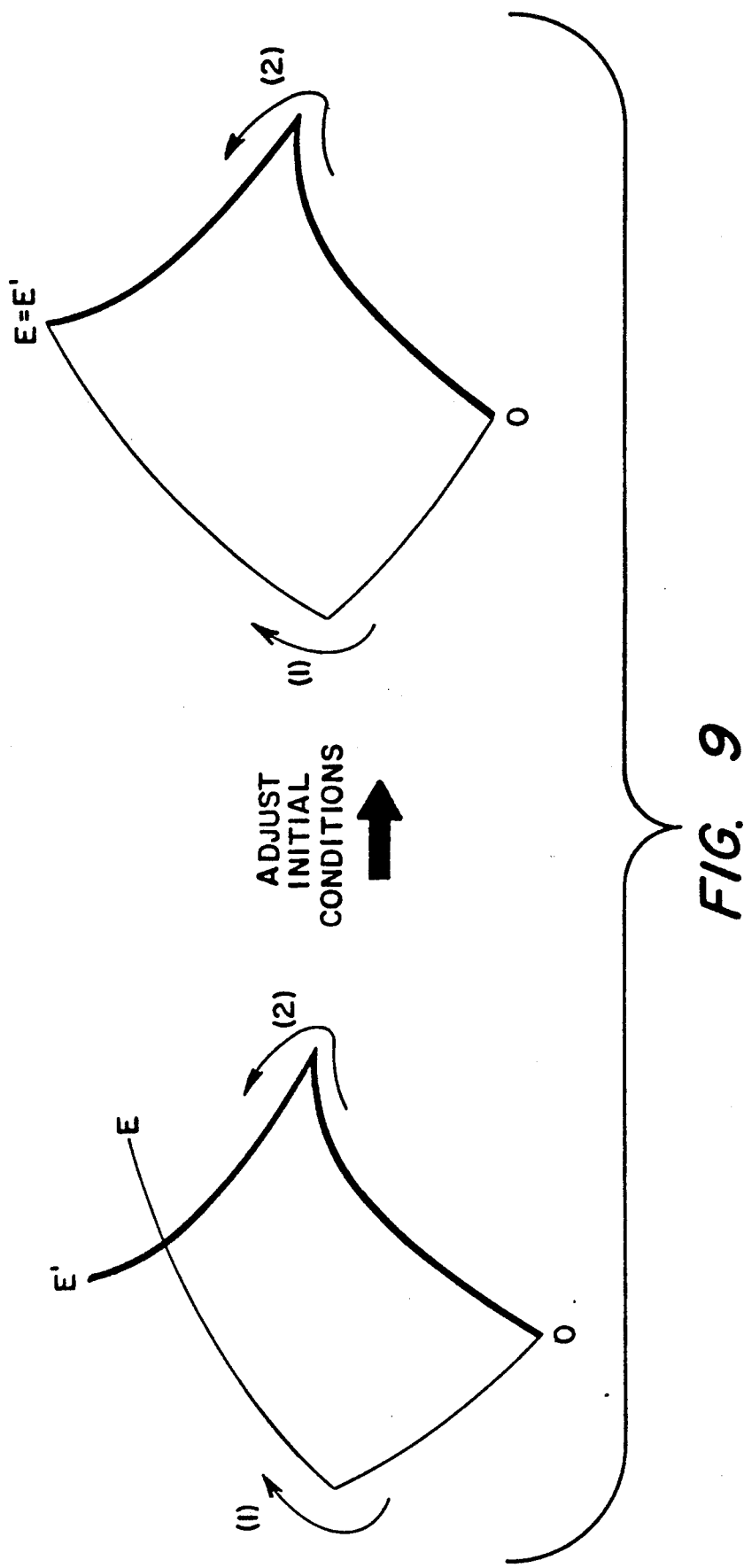
FIG. 9 illustrates adjusting initial conditions to ensure the end points of integration path 1 and path 2 converge.

The curves on the 3-dimensional surface and the corresponding 2-dimensional curves that are derived are actually those defining the patch borders, and this is done curve by curve. The procedure further comprises integrating along the patch border to obtain the surface development. At patch corners, the isometric property is used to reestablish new conditions. FIG. 9 shows a single patch and, on the left, that integrating from one corner in opposite directions yields separate end points E and E' for integration paths (1) and (2). Since surfaces with non-zero Gaussian curvature, in theory, are not developable, the integration will not have a consistent end point if different paths are followed. To compensate for the deviation, initial conditions are modified at the corners of integration paths so that E = E' as illustrated at the right side of the figure. This results in a smoothly distributed strain when the plies are put in the mold.

The foregoing development procedures are adequate for many industrial parts, but for complexly shaped parts such as that in FIG. 1 with singly and doubly curved surfaces that intersect, additional operations may be required. An iso-thickness contour encloses some or all of a face, which is part of a surface with boundaries. It may also extend beyond the boundary of the face. The region of interest for defining a ply is thus the region enclosed by the iso-thickness contours and the face boundaries. The boundary of a face is its intersection with adjacent faces. The intersection curves are computed by the following steps. First, points which are on the intersection of both faces are determined. Then, these points of intersection are mapped onto both faces to obtain their parametric coordinates on each face. Therefore, each point is associated with 3 sets of coordinates, namely, Cartesian coordinates and two sets of parametric coordinates on the two adjacent faces. Finally, these points are sorted into intersection curves for trimming and merging procedures as follows.

Figure 10A:
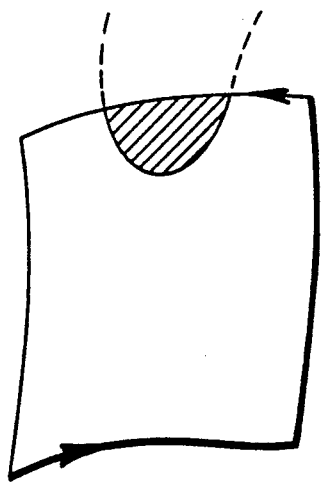
FIGS. 10a–c show typical cases of contours outside a region; dotted curve segments represent the portion to be trimmed.
Figure 10B:
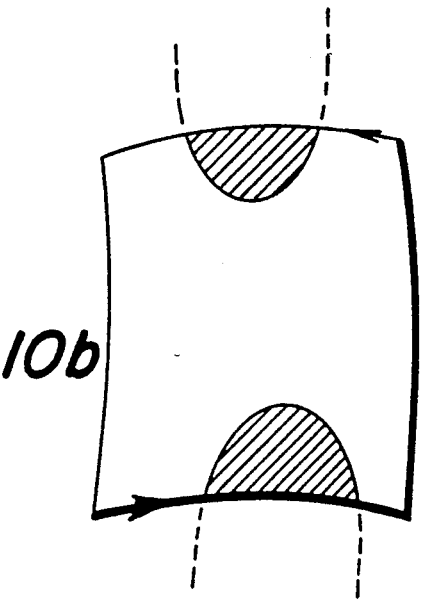
Figure 10C:
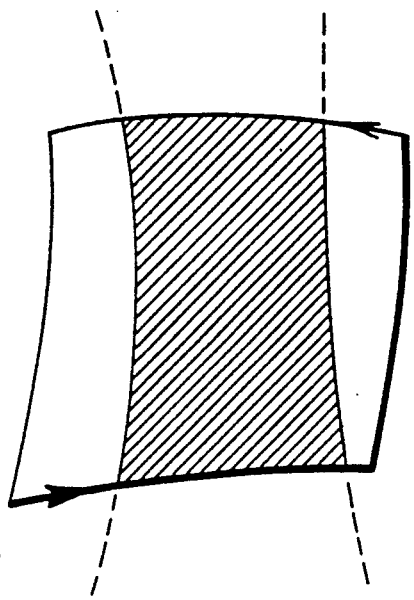

An iso-thickness contour extending beyond the face is trimmed by removing sections that are outside the boundary of the face. FIGS. 10a,b,c show a face and iso-thickness contour curves that extend onto the face. "Inside" and "outside" sense is determined by the path direction of the contour boundary curves. As illustrated when the boundary is traced in the counter-clockwise direction, "inside" is on the left-hand side of the path. The resulting plies are shown in crosshatching, and the dotted curve segments represent the portion that is trimmed.

Figure 11:
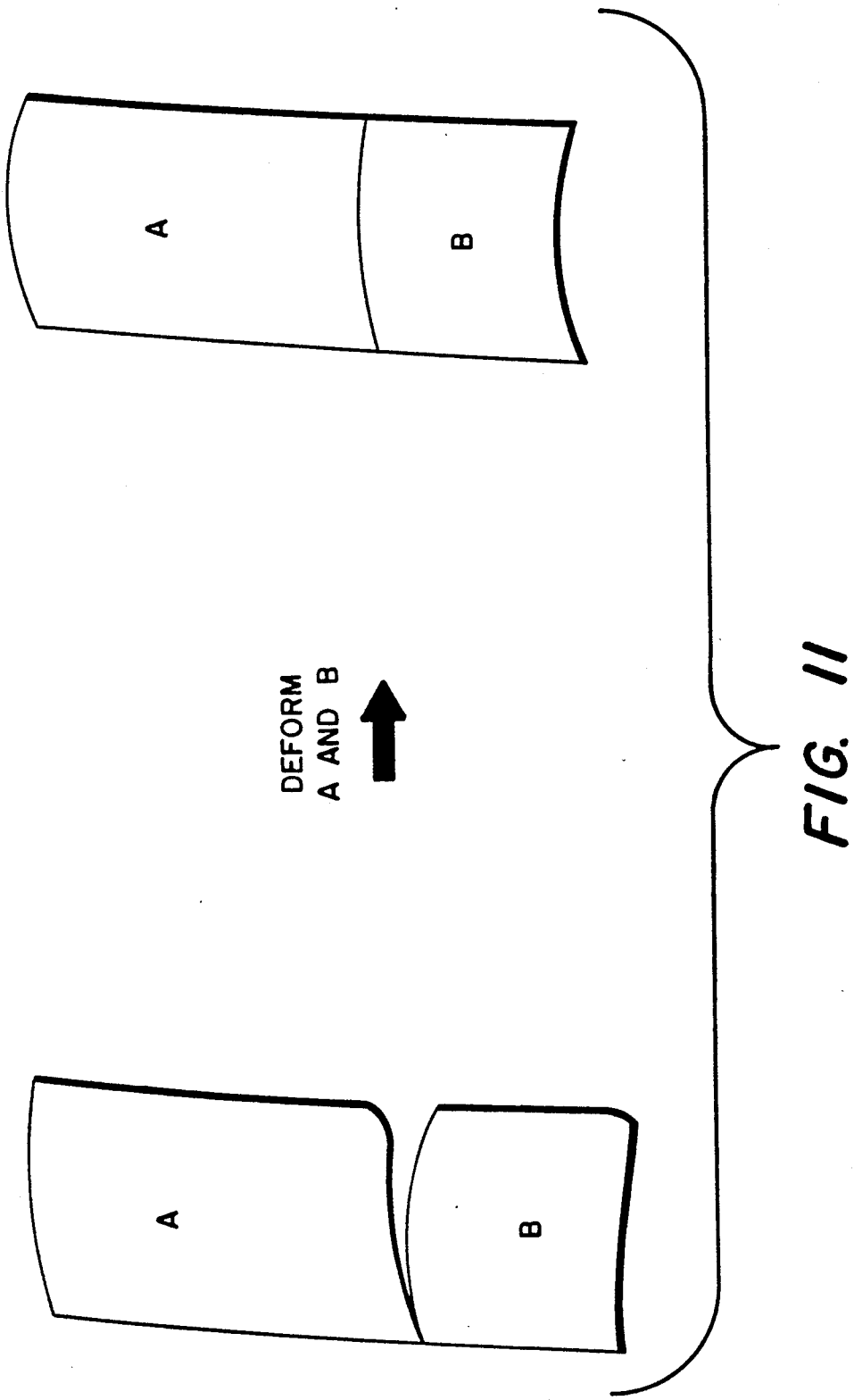
FIG. 11 illustrates deforming the borders to merge two faces into a single ply.

FIG. 11 relates to deforming the borders to match two faces A and B into a single ply. Across the boundaries of two adjacent faces there exists discontinuities of the geodesic curvature. In general, except for planar faces, the planar development of two adjacent faces does not match. In a joining or merging procedure, the developed faces A and B are further deformed to match each other as shown in the figure at a set of control points on the boundary curve.

Although the illustrative embodiments are ply patterns for aircraft engine composite components, the invention is applicable to other composite components and in general to parts made by stacking and joining or consolidating a plurality of plies. The foregoing mathematical terms have their usual meaning as given in references such as the International Dictionary of Applied Mathematics, 1960, D. Van Nostrand Company, Inc. and Handbook of Mathematics, Bronshtein and Semendyayev, 1985, Van Nostrand Reinhold Company.

While the invention has been particularly shown and described with reference to preferred embodiments thereof, it will be understood by those skilled in the art that various changes in form and details may be made without departing from the spirit and scope of the invention as defined in the appended claims.

What is claimed is:

1. A computerized ply pattern generation process to be used in the manufacture of industrial parts by stacking and joining a plurality of plies comprising:

providing a 3-dimensional solid model of the part and a mid-surface thereof;

decomposing said part model into nested shells each having a thickness approximately equal to the net thickness of the plies;

unfolding said shells in sequence to respective planar patterns using a surface development procedure; and determining contours of the planar patterns which are the boundaries of the respective plies.

2. The process of claim 1 wherein said decomposing comprises deriving two sets of the nested shells, one set on either side of said mid-surface, and said unfolding to planar patterns and determining contours is performed for both sets.

3. The process of claim 1 further comprising cutting out the plies from a flexible flat sheet of material and stacking the plies.

4. The process of claim 1 wherein every shell has a surface which is divided into patches, and said surface development procedure comprises integrating along patch borders and adjusting initial conditions to ensure that end points of different integration paths converge.

5. A computerized ply pattern generation process to be used in the manufacture of industrial parts by stacking and joining many plies comprising:

providing a 3-dimensional solid model of the part and first and second curved outer surfaces and a curved mid-surface thereof;

decomposing said part model into nested 3-dimensional shells by calculating distances from said outer surfaces to said mid-surface at a network of points and producing contours of said shells by interpolating along said distances;

developing said shells in sequence to respective planar patterns using a surface development procedure and dividing every shell surface into 3-dimensional patches which are mapped to 2-dimensional unfolded surfaces and aligned; and determining contours of the planar patterns which are the boundaries of the respective plies.

6. The process of claim 5 further comprising cutting out the plies from flexible flat sheet material and stacking the plies.

7. The process of claim 5 wherein said outer surfaces are doubly curved and said developing comprises integrating along patch borders and adjusting initial conditions to ensure that end points of different integration paths converge.

8. The process of claim 7 further comprising trimming surfaces outside the boundary of every ply.

9. The process of claim 8 further comprising deforming the patch borders and merging to form a continuous ply.

10. A computerized ply pattern generation process to be used in the manufacture of composite parts by stacking and pressure molding pre-impregnated plies comprising:

providing a 3-dimensional solid model of the part and first and second curved outer surfaces and a curved mid-surface thereof;

decomposing said part model into nested 3-dimensional shells having a thickness approximately equal to that of the plies, by calculating distances from said outer surfaces to said mid-surface at a network of points and producing contours of said shells by interpolating along said distances;

developing said shells in sequence to respective planar ply patterns using a surface development procedure and dividing every shell surface into 3-dimensional patches which are mapped to 2-dimensional unfolded surfaces and aligned, said development procedure comprising integrating along patch borders and adjusting initial conditions to ensure that end points of different integration paths converge; and determining contours of the planar ply patterns which are boundaries of the respective plies.

11. The process of claim 10 where said shells all have the same thickness.

12. The process of claim 10 further comprising cutting out the ply patterns from flat sheets of material and stacking the plies.

13. The process of claim 10 further comprising trimming the surfaces outside the boundary of every ply.

14. The process of claim 13 further comprising deforming the patch borders and merging to form a continuous ply.

* * * * *

UNITED STATES PATENT AND TRADEMARK OFFICE
CERTIFICATE OF CORRECTION

PATENT NO. : 5,038,291

DATED : August 6, 1991

INVENTOR(S) : Weiping Wang and James M. Beck

It is certified that error appears in the above-identified patent and that said Letters Patent is hereby corrected as shown below:

On the title page, Attorney, Agent, or Firm:

Please change Marilyn Glaubensklee; James C. Davis, Jr.; Paul R. Webb, II to:

Paul R. Webb, II; James C. Davis, Jr.

Signed and Sealed this

First Day of December, 1992

*Attest:*

DOUGLAS B. COMER

*Attesting Officer* — *Acting Commissioner of Patents and Trademarks*